US006105866A

United States Patent [19]

Morrison et al.

[11] Patent Number: 6,105,866

[45] Date of Patent: Aug. 22, 2000

[54] METHOD AND APPARATUS FOR REDUCING SHRINKAGE DURING OPERATION OF A SELF-SERVICE CHECKOUT TERMINAL

[75] Inventors: James Morrison, Suwanee; Joanne S. Walter, Alpharetta, both of Ga.

[73] Assignee: NCR Corporation, Dayton, Ohio

[21] Appl. No.: 08/991,060

[22] Filed: Dec. 15, 1997

[51] Int. Cl.[7] ........................... G06K 15/00; G06F 17/00

[52] U.S. Cl. ........................................... 235/383; 235/375

[58] Field of Search ..................................... 235/383, 375

[56] References Cited

U.S. PATENT DOCUMENTS 3,263,774 8/1966 Reese et al. ................................ 186/1
4,071,740 1/1978 Gogulski ................................ 235/383
4,327,819 5/1982 Coutta ....................................... 186/62
4,676,343 6/1987 Humble et al. ........................... 186/61
4,723,118 2/1988 Hooley et al. .......................... 340/568
4,725,822 2/1988 Hooley ................................... 340/568
4,736,098 4/1988 Rehrig ................................. 250/222.1
4,779,706 10/1988 Mergenthaler ............................ 186/61
4,787,467 11/1988 Johnson ................................. 235/383
4,866,661 9/1989 De Prins ................................ 364/900
4,929,819 5/1990 Collins, Jr. ............................. 235/383
5,083,638 1/1992 Schneider ................................. 186/61
5,115,888 5/1992 Schneider ............................... 235/383
5,123,494 6/1992 Schneider ................................. 177/50
5,125,465 6/1992 Schneider ................................. 186/61
5,168,961 12/1992 Schneider ................................. 186/52
5,375,680 12/1994 Ikeda et al. ............................. 235/383
5,424,524 6/1995 Ruppert et al. ......................... 235/383
5,485,006 1/1996 Allen et al. .......................... 250/222.1
5,540,301 7/1996 Dumont .................................... 186/61
5,543,607 8/1996 Watanabe et al. ...................... 235/383
5,747,784 5/1998 Walter et al. ........................... 235/383
5,752,582 5/1998 Hayward .................................. 186/61
5,883,968 3/1999 Welch et al. ............................ 382/100

*Primary Examiner*—Karl D. Freah
*Assistant Examiner*—Douglas X. Rodriguez
*Attorney, Agent, or Firm*—Maginot, Addison & Moore

[57] ABSTRACT

A method of operating a self-service checkout terminal includes the step of generating an end-of-itemization control signal in response to a user's indication that the user has no further items to enter into the checkout terminal. The method also includes the step of generating a message in response to generation of the end-of-itemization control signal which instructs the user to (1) verify that the user has no further items to enter into the checkout terminal, and (2) perform a first verification activity if the user has no further items to enter into the checkout terminal. The method further includes the step of generating a confirmation control signal in response to the user's performance of the first verification activity. A self-service checkout terminal having a display monitor for displaying a message which instructs the user to verify that the user has no further items prior to tendering payment is also disclosed.

20 Claims, 4 Drawing Sheets

METHOD AND APPARATUS FOR REDUCING SHRINKAGE DURING OPERATION OF A SELF-SERVICE CHECKOUT TERMINAL

TECHNICAL FIELD OF THE INVENTION

The present invention relates generally to a checkout or point-of-sale (POS) terminal, and more particularly to a method and apparatus for reducing shrinkage during operation of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a user or customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

A major concern that retailers have when evaluating a self-service checkout terminal is the level of shrinkage that may occur as a result of a customer's use of the terminal. What is meant herein by the term "shrinkage" is the number, percentage, or dollar value of items that is taken or otherwise removed from the retailer's store by a customer without having first been properly paid for by the customer. It should be appreciated that shrinkage may be the result of an intentional act of the customer (e.g. theft or fraud), or may be the result of an unintentional act of the customer (e.g. the case of when the customer leaves the store with an item inadvertently left on the bottom rack of a shopping cart that was not paid for by the customer during the checkout procedure).

In traditional (i.e. assisted) checkout systems, the clerk employed by the retailer to operate the checkout terminal provides a level of protection against shrinkage. In particular to the case of unintentional shrinkage, the clerk is generally trained by the retailer to visually scan or otherwise check the shopping cart for the presence of unscanned items prior to the end of the checkout procedure. However, a customer typically has little or no training in the operation of a self-service checkout terminal prior to his or her initial use of the checkout terminal. Hence, in the case of a self-service checkout terminal, the terminal itself must provide the necessary protection against shrinkage.

What is needed therefore is a self-service checkout terminal which reduces shrinkage during the operation thereof. What is further needed is a self-service checkout terminal which assists or otherwise aids the customer in the use thereof in a manner which is conducive to shrinkage reduction.

SUMMARY OF THE INVENTION

According to a first embodiment of the present invention, there is provided a method of operating a self-service checkout terminal. The method includes the step of generating an end-of-itemization control signal in response to a user's indication that the user has no further items to enter into the checkout terminal. The method also includes the step of generating a message in response to generation of the end-of-itemization control signal which instructs the user to (1) verify that the user has no further items to enter into the checkout terminal, and (2) perform a first verification activity if the user has no further items to enter into the checkout terminal. The method further includes the step of generating a confirmation control signal in response to the user's performance of the first verification activity.

According to a second embodiment of the present invention, there is provided a method of operating a self-service checkout terminal. The method includes the step of generating an end-of-itemization control signal in response to a user's indication that the user has no further items to enter into the checkout terminal. The method also includes the step of generating a message in response to generation of the end-of-itemization control signal which instructs the user to (1) inspect a shopping cart of the user to verify that the shopping cart has no further items therein, and (2) perform a first verification activity if the shopping cart has no further items therein. The method further includes the step of generating a confirmation control signal in response to the user's performance of the first verification activity.

According to a third embodiment of the present invention, there is provided a self-service checkout terminal. The checkout terminal includes a mechanism for generating an end-of-itemization control signal in response to a user's indication that the user has no further items to enter into the checkout terminal. The checkout terminal also includes a mechanism for generating a message in response to generation of the end-of-itemization control signal which instructs the user to (1) verify that the user has no further items to enter into the checkout terminal, and (2) perform a first verification activity if the user has no further items to enter into the checkout terminal. The checkout terminal further includes a mechanism for generating a confirmation control signal in response to the user's performance of the first verification activity.

It is therefore an object of the present invention to provide a new and useful self-service checkout terminal.

It is another object of the present invention to provide an improved self-service checkout terminal.

It is moreover an object of the present invention to provide a new and useful method of operating a self-service checkout terminal.

It is a further object of the present invention to provide an improved method of operating a self-service checkout terminal.

It is yet another an object of the present invention to provide a method and apparatus for reducing shrinkage during operation of a self-service checkout terminal.

The above and other objects, features, and advantages of the present invention will become apparent from the following description and the attached drawings.

DETAILED DESCRIPTION OF THE INVENTION

Figure 1:
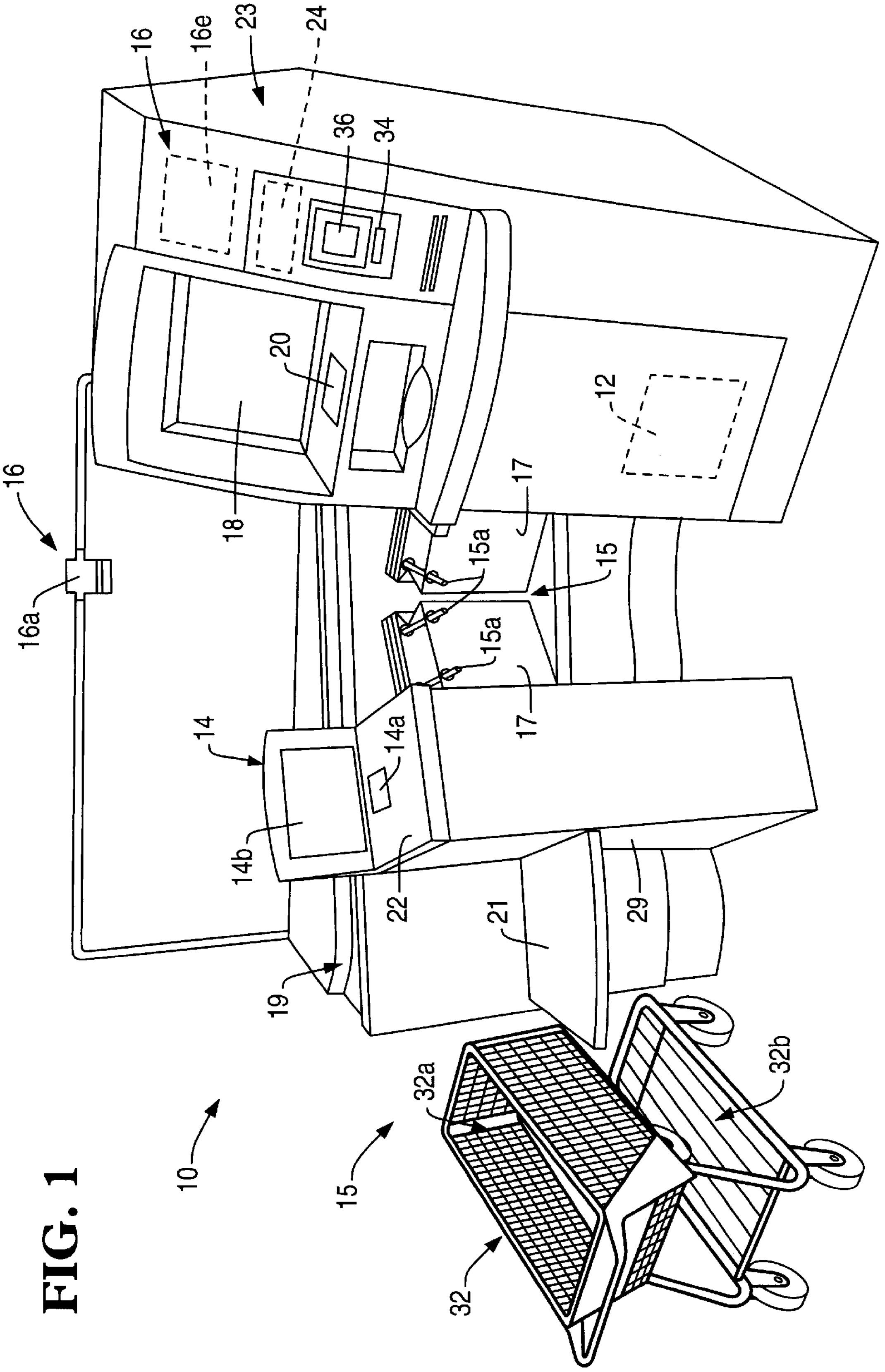
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
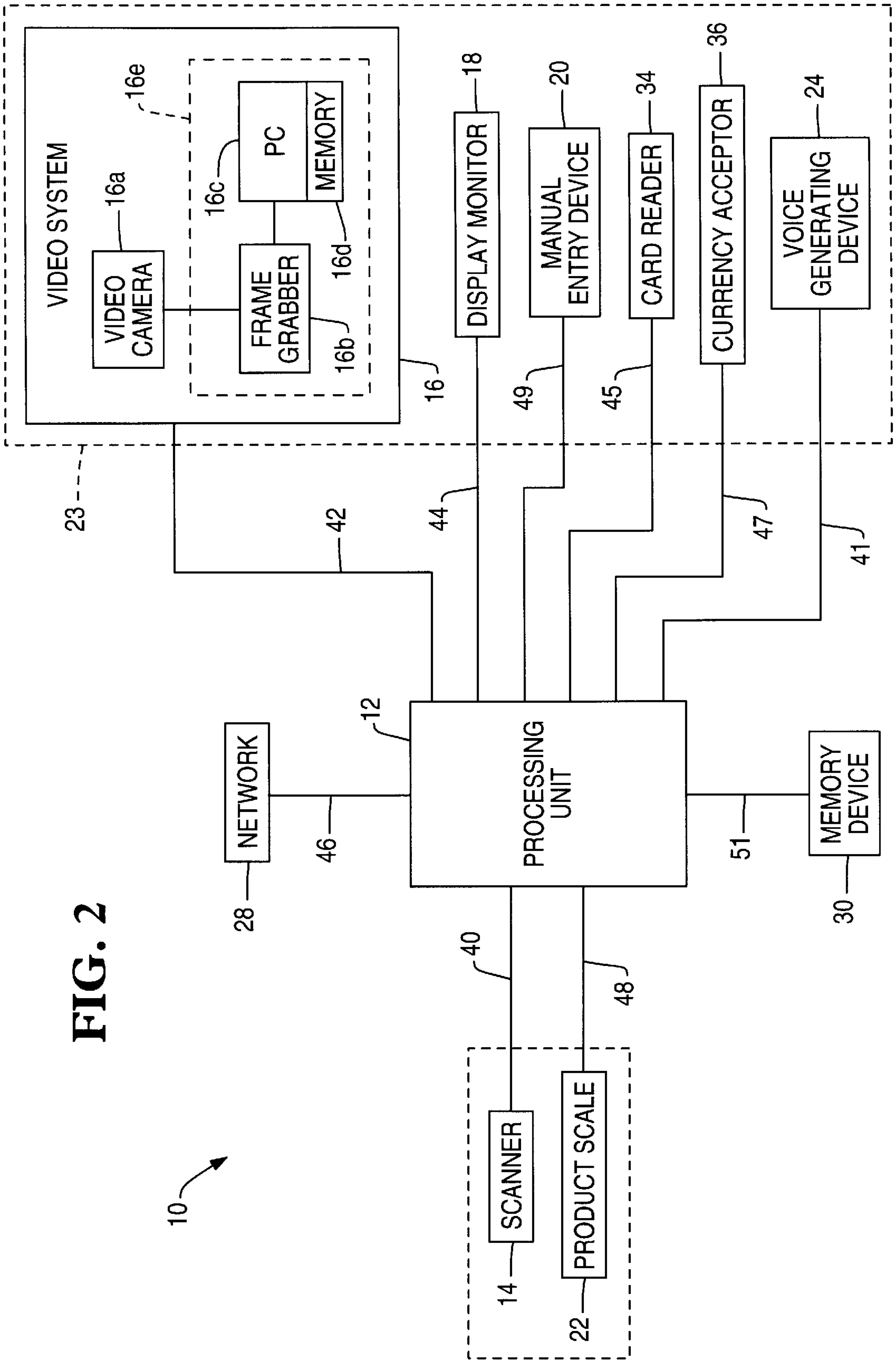
FIG. 2 is a simplified block diagram of the self-service checkout terminal of FIG. 1.

Referring now to FIGS. 1 and 2, there is shown a self-service checkout terminal 10 for use in a retail business such as a grocery store. The self-service checkout terminal 10 includes a processing unit 12, a scanner 14, a video system 16, a display monitor 18, a manual entry device 20, a product scale 22, a voice generating device 24, a card reader 34, and a currency acceptor 36. The self-service checkout terminal 10 also includes a bagwell 15 for accommodating one or more grocery bags 17, a counter 19, and a basket shelf 21. The display monitor 18, the manual entry device 20, the card reader 34, the currency acceptor 36, and a number of the components associated with the video system 16 may be embodied as separate devices, or they may be preferably embodied as integrated components associated with an automated teller machine (ATM) 23. For example, a video camera 16*a* of the video system 16 may be embodied as a separate component (see FIG. 1), or may be alternatively embodied as a component integrated into the ATM 23 (see FIG. 2).

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14*a* and a second scanning window 14*b*. The first scanning window 14*a* is disposed in a substantially horizontal manner, whereas the second scanning window 14*b* is disposed in a substantially vertical manner, as shown in FIG. 1. The product scale 22 is integrated with the scanner 14. More specifically, the product scale 22 is disposed substantially parallel to the scanning window 14*a* thereby enveloping the scanning window 14*a*. If an item such as produce is placed upon the product scale 22 or the first scanning window 14*a*, the product scale 22 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then be used to determine the cost of the item in a known manner.

The video camera 16*a* of the video system 16 is disposed above the counter 19 and is positioned in order to have a field of view of the area surrounding the self-service checkout terminal 10. In addition, the video camera 16*a* is positioned for detecting motion within a number of "target areas" associated with the video system 16. What is meant herein by use of the term "target area" of the video system 16 is an area across which the video system 16 is capable of detecting motion. For example, a first target area is defined by the maximum range in which an item can be successfully scanned as it is passed across the scanner 14, whereas a second target area is defined by the area proximate the bagwell 15. By detecting motion in such target areas, the video camera 16*a* may be used for enhancing security associated with operation of the self-service checkout terminal. For example, if the video system 16 detects an item being placed into one of the grocery bags 17 in the bagwell 15 prior to having been scanned with the scanner 14, an error message may be displayed on the display monitor 18 in order to instruct the user to remove the item from the grocery bag 17.

The display monitor 18 displays instructions which serve to guide a user through a checkout procedure. For example, an instruction is displayed on the display monitor 18 which instructs the user to remove an item from a grocery cart 32 and thereafter pass the item over the scanner 14. If the scanner 14 successfully scans or reads the product identification code associated with the item, then a visual indication is generated on the display monitor 18. If for any reason the scanner 14 cannot read or otherwise determine the product identification code associated with the item, a visual error message is generated on the display monitor 18. In addition, the display monitor 18 may be used to generate a visual message for the purpose of reducing inadvertent shrinkage. In particular, as shall be discussed below in more detail, a message may be displayed on the display monitor 18 which queries the user as to if any items have been inadvertently left in the shopping cart 32. The display monitor 18 is preferably configured as a known touch screen monitor which can generate data signals when certain areas of the screen are touched by a user thereby allowing the user to respond to instructions and/or questions which are displayed on the display monitor 18.

In addition to, or in lieu of the display monitor 18, messages and instructions may also be generated by the voice generating device 24. Such a voice generating device 24 may be particularly useful for generating audio or voice instructions for users who may otherwise be precluded from using the self-service checkout 10. For example, the voice generating device 24 may be used to facilitate operation of the self-service checkout terminal 10 by a sight-impaired user. Moreover, the voice generating device 24 may be configured in order to operate continually or selectively. In particular, the voice generating device 24 may be configured to operate in conjunction with the display monitor 18. For example, the voice generating device 24 may be used to inform the user of the type and cost of each item scanned thereby reducing the number of occasions in which the user must look at the display monitor 18 during operation of the self-service checkout terminal 10. Alternatively, the voice generating device 24 may be configured to operate only after having been actuated by the user in order to reduce the amount of noise generated at the checkout area of the grocery store. It should be appreciated that actuation of the voice generating device 24 may be accomplished in a number of different manners. For example, information may be stored on a user's loyalty card which upon insertion of the card into the card reader 34 identifies the user as being sight-impaired thereby causing the processing unit 12 to actuate the voice generating device 24. Moreover, a portion of the display monitor 18 or a key associated with the manual entry device 20 may, upon being touched or otherwise pressed by the user, actuate and/or deactuate the voice generating device 24.

The bagwell 15 is disposed between the scanner 14 and the ATM 23. The bagwell 15 includes a number of posts 15*a* which cooperate to support a number of the grocery bags 17. The bagwell 15 is configured to allow two or more grocery bags 17 to be accessed by the user at any given time. In particular, the posts 15*a* are of a sufficient length to secure a number of unopened grocery bags 17 along with two or more opened grocery bags 17 thereby allowing a user to selectively load various item types into the grocery bags 17. For example, the user may desire to use a first grocery bag 17 for household chemical items such as soap or bleach, and a second grocery bag 17 for edible items such as meat and produce.

The basket shelf 21 is provided to allow a user of the self-service checkout terminal 10 to position a shopping or hand basket (not shown) or the like thereon in order to facilitate unloading of items for purchase. Alternatively, the basket shelf 21 may be retracted into a slot (not shown) defined in a side panel 29 of the self-service checkout terminal 10 thereby allowing the user to more closely position the grocery cart 32 adjacent the self-service checkout terminal 10 in order to facilitate the unloading of items from the grocery cart 32 during the checkout procedure.

FIG. 2 shows a simplified block diagram of the self-service checkout terminal 10. The processing unit 12 is electrically coupled to the scanner 14, the video system 16, the display monitor 18, the manual entry device 20, the product scale 22, the voice generating device 24, the card reader 34, and the currency acceptor 36. Moreover, the processing unit 12 is electrically coupled to a network 28 and a memory device 30, as shown in FIG. 2.

The processing unit 12 monitors output signals generated by the scanner 14 and the video system 16 in order to supervise and provide security monitoring of a given checkout procedure. In particular, the processing unit 12 communicates with the scanner 14 via a data communication line 40. The scanner 14 generates an output signal on the data communication line 40 when a bar or product identification code associated with an item is successfully scanned or otherwise read by the scanner 14.

The processing unit 12 communicates with the video system 16 through a data communication line 42. The video system 16 includes the video camera 16*a*, a frame grabber 16*b*, and a processing system 16*c* such as a personal computer (PC). The PC 16*c* and the frame grabber 16*b* are collectively referred to as a video processor 16*e*. The video processor 16*e* receives a standard video signal format, such as RS-170, NTSC, CCIR, or PAL, from the video camera 16*a*.

Video output signals from the video camera 16*a* are input to the frame grabber 16*b*. The frame grabber 16*b* operates to convert the analog video signals from the video camera 16*a* into a digital image which is stored within a memory 16*d* for subsequent processing by the video processor 16*e*. Once representations of the stream of digital images from the video camera 16*a* are sequentially stored in memory 16*d*, the video processor may begin to analyze or otherwise process the video image. One video system 16 which is suitable for use in the present invention is disclosed in U.S. Provisional Patent Application Ser. No. 60/045,001 entitled "Motion Pattern Recognition for a Self Checkout System" which was filed on Feb. 7, 1997, by Ralph Crabtree, which is incorporated herein by reference, and which is assigned to the same assignee as the present invention.

The processing unit 12 communicates with the voice generating device 24 via a data communication line 41. Hence, the processing unit 12 may selectively generate output signals on the data communication line 41 thereby causing audible messages or instructions to be generated by the voice generating device 24.

The processing unit 12 communicates with the display monitor 18 through a data communication line 44. The processing unit 12 generates output signals on the data communication line 44 which cause various instructional messages to be displayed on the display monitor 18. As alluded to above, the display monitor 18 may include known touch screen technology which can generate output signals when the user touches a particular area of the display screen associated with the display monitor 18 thereby enabling the display monitor 18 to function as a data input device of the self-service checkout terminal 10. The signals generated by the display screen are transmitted to the processing unit 12 via the data communication line 44.

The processing unit 12 is coupled to the product scale 22 via a data communication line 48. The product scale 22 generates output signals on the data communication line 48 which are indicative of the weight of an item positioned on the product scale 22.

The manual entry device 20 is coupled to the processing unit 12 through a data communication line 49. The manual entry device 20 may include one or more keypads or touch pads thereby enabling the manual entry device 20 to function as a data input device of the self-service checkout terminal 10.

The card reader 34 is coupled to the processing unit 12 through a data communication line 45. The card reader 34 may include one or more credit card readers, debit card readers, or smart card readers thereby enabling a user to pay for his or her purchases by either (1) having a stored amount reduced on a cash card such as a debit or ATM card, or (2) having an amount charged to a credit card.

The currency acceptor 36 is coupled to the processing unit 12 through a data communication line 47. The currency acceptor 36 may include both a paper currency acceptor and a coin acceptor thereby enabling a user to tender payment for his or her purchases with cash.

The processing unit 12 includes network interface circuitry (not shown) which conventionally permits the self-service checkout terminal 10 to communicate with the network 28 such as a LAN or WAN through a wired connection 46. The processing unit 12 communicates with the network 28 during the checkout procedure in order to communicate with a paging system (not shown) or the like which pages or otherwise alerts the retailer's personnel as described further below. In addition, the processing unit 12 communicates with the network 28 to obtain information such as pricing information on an item being scanned, and also to verify user credit approval when appropriate. The network interface circuitry associated with the self-service checkout terminal 10 may include a known Ethernet expansion card, and the wired connection 46 may include a known twisted-pair communication line. Alternatively, the network interface circuitry may support wireless communications with the network 28.

The processing unit 12 communicates with the memory device 30 via a data communication line 51. The memory device 30 is provided to maintain an electronic transaction table which includes a record of the product information associated with each item that is scanned, weighed, or otherwise entered during the user's operation of the self-service checkout terminal 10. For example, if the user scans a can of soup, the description of the soup and the pricing information associated therewith is recorded in the transaction table in the memory device 30. Similarly, if the user weighs a watermelon with the product scale 22 and then enters a product identification code associated with watermelon via the manual entry device 20, the product information associated with the watermelon would be recorded in the transaction table. Moreover, if a user entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the user pays for his or her transaction. Moreover, data stored in the transaction table is printed out on a printer (not shown) thereby generating a receipt for the user at the end of his or her transaction.

Figure 3:
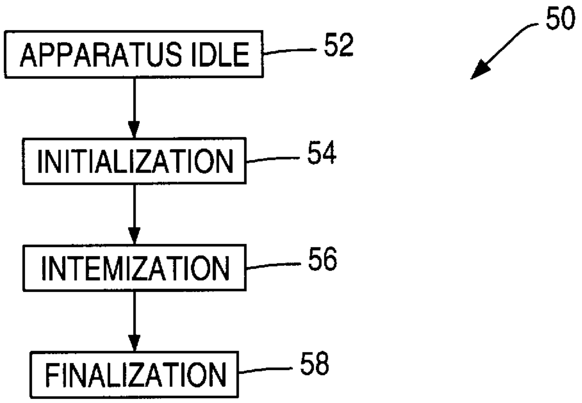
FIG. 3 is a flowchart setting forth the general procedure for checking out items through the self-service checkout terminal of FIG. 1.

Referring now to FIG. 3, there is shown a flowchart which sets forth a general procedure 50 for checking out items through the self-service checkout terminal 10. When a user arrives at the self-service checkout terminal 10, the self-service checkout terminal 10 is in an idle state (step 52). An initialization step 54 is executed prior to checking out items for purchase. In particular, one or more initialization instructions are displayed on the display monitor 18 which instruct the user to (1) select a desired method of payment, and/or (2) identify himself or herself by inserting a shopping card, loyalty card, debit/ATM card, credit card, smart card, etc. into the card reader 34 (see FIG. 1). As alluded to above, information stored on such a card may be read by the card reader 34 in order to "customize" operation of the self-service checkout terminal 10 to the specific needs of a particular user. For example, the user's loyalty card may have information stored thereon which identifies the user as being sight impaired thereby activating the voice generating device 24.

At the completion of the initialization step 54, the routine 50 advances to an itemization step 56 where the user scans the individual items for purchase across the scanner 14. Moreover, in step 56 the user weighs items such as produce or meat with the product scale 22, and thereafter enters the product identification code associated with the item via a data input device associated with the self-service checkout terminal 10 (i.e. either pressing a particular key associated with the manual entry device 20 or by touching a particular area of the display monitor 18). At the completion of the itemization step 56, the routine 50 advances to a finalization step 58 in which (1) payment is tendered by either inserting currency into the currency acceptor 36, charging a credit card, or reducing an amount stored on a debit, ATM, or smart card via the card reader 34, and (2) a grocery receipt is printed. It should be appreciated that in the case of when a user inserts currency into the currency acceptor 36, the self-service checkout terminal 10 may provide change via a paper currency dispenser (not shown) and/or a coin dispenser (not shown). After completion of the finalization step 58, the routine 50 returns to step 52 in which the self-service checkout terminal 10 remains in the idle state until a subsequent user initiates a checkout procedure.

Figure 4:
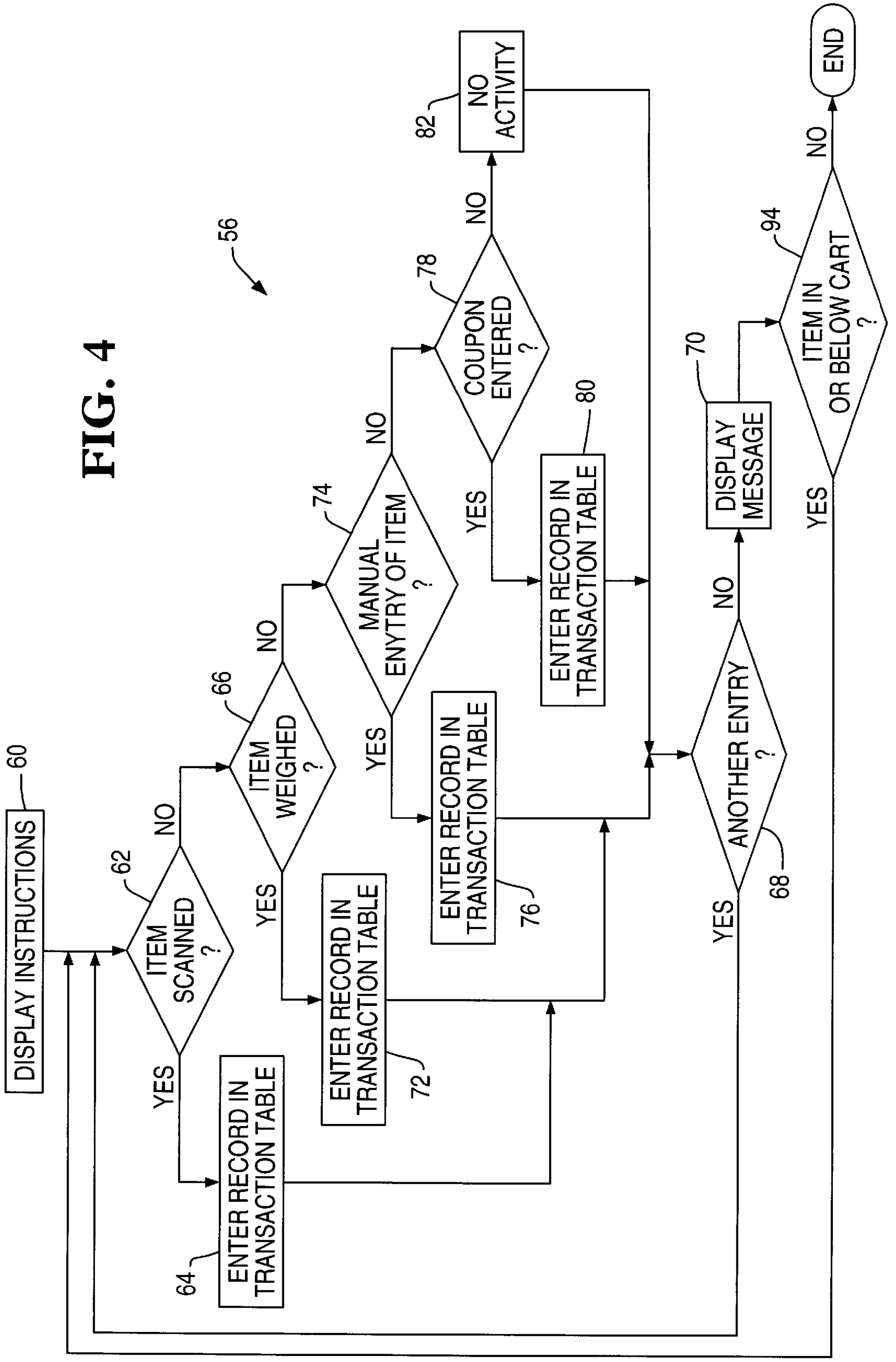
FIG. 4 is a flowchart setting forth in detail the itemization step of the general procedure of FIG. 3.

Referring now to FIG. 4, there is shown a flowchart setting forth the itemization step 56 in greater detail. After the initialization step 54 (see FIG. 3) is completed, the routine 56 advances to step 60 where a message is displayed on the display monitor 18 which instructs the user to either (1) pass or otherwise scan individual items across or adjacent the scanner 14 with the product identification code facing one of the scanning windows 14*a*, 14*b*, (2) place an item on the product scale 22 in order to determine the weight associated therewith, (3) enter the product identification code associated with the item via the manual entry device 20, or (4) enter an identification code associated with a coupon or voucher via either the scanner 14 (if the coupon or voucher has a bar code printed thereon) or the manual entry device 20.

The routine 56 then advances to step 62 where the processing unit 12 scans or reads the data communication line 40 to determine whether the scanner 14 has successfully read or otherwise captured the product identification code associated with the item. More specifically, the scanner 14 generates an output signal which is sent to the processing unit 12 once the scanner 14 successfully reads the product identification code associated with the item. If the code is successfully read from the item, the routine 56 advances to step 64. If the code is not successfully read from the item, the routine 56 advances to step 66.

In step 64, the processing unit 12 adds a record of the item scanned in step 62 to the transaction table. In particular, the processing unit 12 communicates with the network 28 to obtain the product information (e.g. description and price) of the scanned item. Thereafter, the processing unit 12 updates the transaction table. More specifically, the processing unit 12 generates an output signal which is sent to the memory device 30 which causes the transaction table to be updated in the memory device 30 to include the product information associated with the scanned item. The routine 56 then advances to step 68.

In step 68, the processing unit 12 monitors the communication line 49 from the manual entry device 20 and the communication line 44 from the display monitor 18 to determine whether the user has more items to be entered. In particular, a message is displayed on the display monitor 18 instructing the user to touch a particular touch screen area displayed on the display monitor 18, or to touch a particular key associated with the manual entry device 20, when the user has completed entering all of the items for purchase.

If a particular signal is detected on either of the communication lines 44 or 49 an end-of-itemization control signal is generated, and the processing unit 12 determines that the user believes that he or she has no additional items to enter into the self-service checkout terminal 10 and the routine 56 advances to step 70. If a particular signal is not detected on either the communication lines 44 or 49, the routine returns to step 62.

Returning now to step 62, if the code is not successfully read from the item by the scanner 14, the routine 56 advances to step 66. In step 66, the processing unit 12 scans or reads the data line 48 to determine if a user has weighed and thereby entered product information associated with an item via the product scale 22. More specifically, the product scale 22 generates an output signal which is sent to the processing unit 12 once the product scale 22 has detected the weight of an item being placed thereon. If the product scale 22 detects the weight of an item thereon, the routine 56 advances to step 72. If the product scale 22 does not detect the weight of an item thereon, the routine 56 advances to step 74.

In step 72, the processing unit 12 adds a record of the item weighed in step 66 to the transaction table. More specifically, the processing unit 12 communicates with the network 28 to obtain the product information (e.g. description and price) of the weighed item. It should be appreciated that the user may first be queried as to the identity of the item on the product scale 22. Such an identity may be entered by the user by either touching a particular location of the display monitor 18 or a particular key associated with the manual entry device 20. Thereafter, the processing unit 12 updates the transaction table. More specifically, the processing unit 12 generates an output signal which is sent to the memory device 30 which causes the transaction table to be updated in the memory device 30 to include the product information associated with the weighed item. The routine 56 then advances to step 68.

As discussed above, in step 68 the processing unit 12 monitors the communication line 49 from the manual entry device 20 and the communication line 44 from the display monitor 18 to determine whether the user has more items to be entered. In particular, a message is displayed on the display monitor 18 instructing the user to touch a particular touch screen area displayed on the display monitor 18, or to touch a particular key associated with the manual entry device 20, when the user has completed entering all of the items for purchase.

If a particular signal is detected on either of the communication lines 44 or 49 an end-of-itemization control signal is generated, and the processing unit 12 determines that the user believes that he or she has no additional items to enter and the routine 56 advances to step 70. If a particular signal is not detected on either the communication lines 44 or 49, the routine returns to step 62.

Returning now to step 66, if the product scale 22 does not detect the weight of an item thereon, the routine 56 advances to step 74. In step 74, the processing unit 12 scans or reads the data communication line 49 to determine if a user manually entered product information associated with an item via the manual entry device 20. More specifically, the manual entry device 20 generates an output signal which is sent to the processing unit 12 once the manual entry device 20 has detected a user entering product information associated with an item. If the manual entry device 20 detects product information associated with an item being entered, the routine 56 advances to step 76. If the manual entry device 20 does not detect product information associated with an item being entered, the routine 56 advances to step 78.

In step 76, the processing unit 12 adds a record of the item manually entered in step 74 to the transaction table. More specifically, the processing unit 12 communicates with the network 28 to obtain the product information (e.g. description and price) of the manually entered item. Thereafter, the processing unit 12 updates the transaction table. More specifically, the processing unit 12 generates an output signal which is sent to the memory device 30 which causes the transaction table to be updated in the memory device 30 to include the product information associated with the manually entered item. The routine 56 then advances to step 68.

As discussed above, in step 68 the processing unit 12 monitors the communication line 49 from the manual entry device 20 and the communication line 44 from the display monitor 18 to determine whether the user has more items to be entered. In particular, a message is displayed on the display monitor 18 instructing the user to touch a particular touch screen area displayed on the display monitor 18, or to touch a particular key associated with the manual entry device 20, when the user has completed entering all of the items for purchase.

If a particular signal is detected on either of the communication lines 44 or 49 an end-of-itemization control signal is generated, and the processing unit 12 determines that the user believes that he or she has no additional items to enter and the routine 56 advances to step 70. If a particular signal is not detected on either the communication lines 44 or 49, the routine returns to step 62.

Returning now to step 74, if the manual entry device 20 does not detect product information associated with an item being entered, the routine 56 advances to step 78. In step 78, the processing unit 12 scans or reads the data communication lines 49, 40 to determine if a user is entering information associated with a coupon via the manual entry device 20 or the scanner 14, respectively. More specifically, the manual entry device 20 or the scanner 14 generates an output signal which is sent to the processing unit 12 once the manual entry device 20 or the scanner 14 has detected a user entering information associated with a coupon. If the manual entry device 20 or the scanner 14 detects information associated with a coupon being entered, the routine 56 advances to step 80. If the manual entry device 20 or the scanner 14 does not detect information associated with a coupon being entered, the routine 56 advances to step 82.

In step 80, the processing unit 12 adds a record of the coupon entered in step 78 to the transaction table. More specifically, the processing unit 12 communicates with the network 28 to obtain the information (e.g. value) associated with the coupon. Thereafter, the processing unit 12 updates the transaction table. More specifically, the processing unit 12 generates an output signal which is sent to the memory device 30 which causes the transaction table to be updated in the memory device 30 to include the information associated with the coupon. The routine 56 then advances to step 68.

As discussed above, in step 68 the processing unit 12 monitors the communication line 49 from the manual entry device 20 and the communication line 44 from the display monitor 18 to determine whether the user has more items to be entered. In particular, a message is displayed on the display monitor 18 instructing the user to touch a particular touch screen area displayed on the display monitor 18, or to touch a particular key associated with the manual entry device 20, when the user has completed entering all of the items for purchase.

If a particular signal is detected on either of the communication lines 44 or 49 an end-of-itemization control signal is generated, and the processing unit 12 determines that the user believes that he or she has no additional items to enter and the routine 56 advances to step 70. If a particular signal is not detected on either the communication lines 44 or 49, the routine returns to step 62.

Returning now to step 78, if the manual entry device 20 or the scanner 14 does not detect information associated with a coupon being entered, the routine 56 advances to step 82. In step 82, since (1) the scanner 14 did not generate an output signal on the data communication line 40 indicating that an item was scanned, (2) the product scale 22 did not generate an output signal on the data communication line 48 indicating that an item was placed thereon, (3) the manual entry device 20 did not generate an output signal on the data communication line 49 indicating that an item was manually entered, and (4) the manual entry device 20 or the scanner 14 did not generate an output signal on the data communication lines 49 or 40, respectively, indicating that a coupon was entered, the processing unit 12 concludes that there is no present attempt being made by the user to enter or otherwise checkout an item. Thus, the routine 56 advances to step 68.

As discussed above, in step 68 the processing unit 12 monitors the communication line 49 from the manual entry device 20 and the communication line 44 from the display monitor 18 to determine whether the user has more items to be entered. In particular, a message is displayed on the display monitor 18 instructing the user to touch a particular touch screen area displayed on the display monitor 18, or to touch a particular key associated with the manual entry device 20, when the user has completed entering all of the items for purchase.

If a particular signal is detected on either of the communication lines 44 or 49 an end-of-itemization control signal is generated, and the processing unit 12 determines that the user believes that he or she has no additional items to enter and the routine 56 advances to step 70. If a particular signal is not detected on either the communication lines 44 or 49, the routine returns to step 62.

In step 70, the processing unit 12 causes a message to be displayed in response to generation of the end-of-itemization control signal in step 68. In particular, the processing unit 12 causes a message to be displayed on the display monitor 18 which instructs the user to (1) verify that he or she has no further items to enter into the self-service checkout terminal 10, and (2) to perform a verification activity (e.g. touch a particular touch screen area associated with the display monitor 18 or to touch a particular key associated with the manual entry device 20) if the user has no further items to enter into the self-service checkout terminal 10.

It should be appreciated that the message which is displayed on the display monitor 18 in step 70 may include one of a number of various instructions in order to determine if the user has additional items to enter into the self-service checkout terminal 10. For example, the message may instruct the user to look (1) in and/or under his or her shopping cart for inadvertently left items, (2) in the user's shopping basket for inadvertently left items, or (3) in the general vicinity of the area surrounding the self-service checkout terminal 10 for any additional items. Moreover, it should also be appreciated that the message generated in step 70 may be supplemented or replaced by a corresponding voice message generated on the voice generating device 24.

Figure 5:
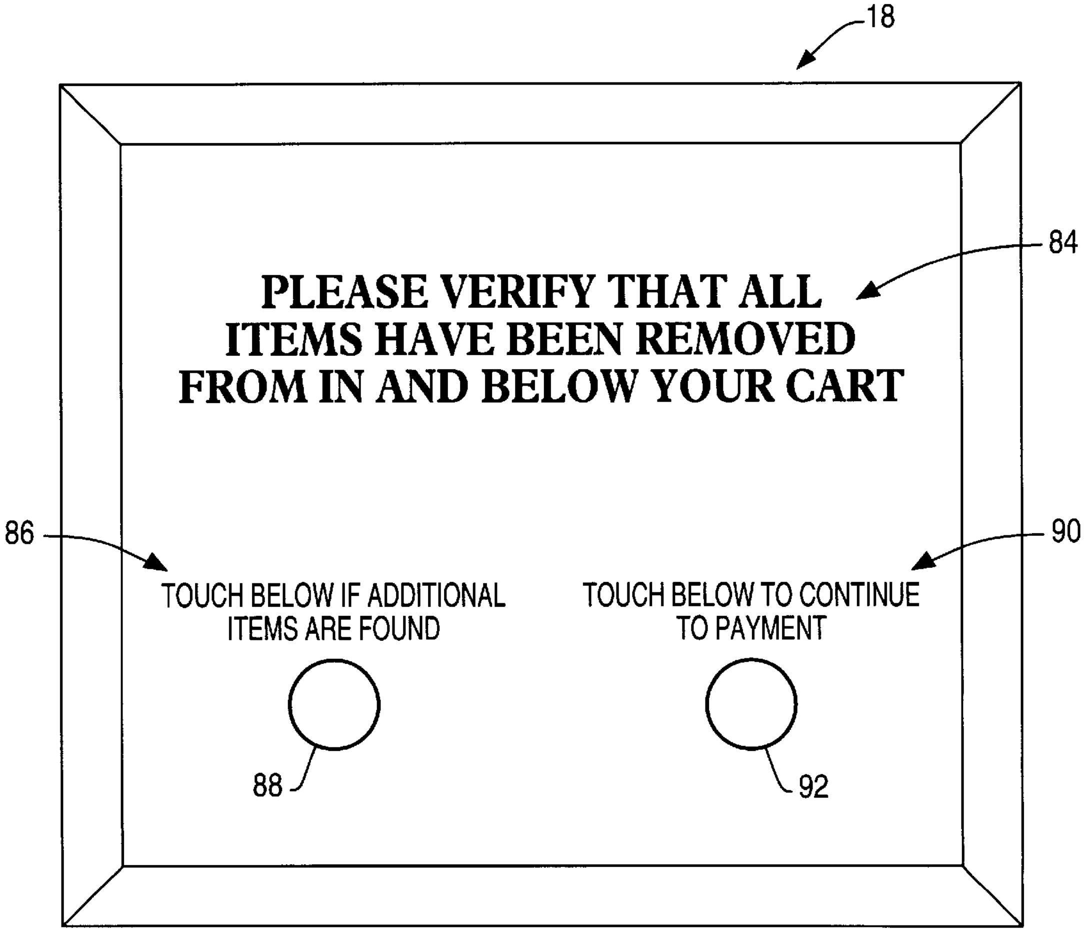
FIG. 5 illustrates a screen display which is displayed on the display monitor 18 during the itemization step of FIG. 4.

One screen display which is suitable for display on the display monitor 18 in step 70 is shown in FIG. 5. In FIG. 5, the user is instructed via a text message 84 to verify that all items have been removed from in and below the user's cart (e.g. the shopping cart 32). It should be appreciated that such a message is intended to instruct the user to inspect both a basket area 32*a* and a bottom or lower rack 32*b* (see FIG. 1) in order to determine if any additional items were inadvertently left behind. A text message 86 instructs the user to touch a touch screen area 88 if additional items are found in or below the cart, whereas a text message 90 instructs the user to touch a touch screen area 92 if no additional items are found in or below the cart so as to allow the user to begin to tender payment for his or her purchases.

After displaying the message in step 70, the routine 56 then advances to step 94. In step 94, the processing unit 12 determines if the user has verified that additional items were found in or below the user's cart (e.g. the shopping cart 32). In particular, if the user touches the touch screen area 88, a return-to-itemization control signal is generated and the routine 56 returns to step 62 in order to monitor entry of the additional item into the self-service checkout terminal 10. If the user touches the touch screen area 92, a confirmation control signal is generated which causes the routine 56 to end. When the routine 56 ends, a payment signal is generated thereby advancing the routine 50 (see FIG. 3) to the finalization step 58.

As alluded to above, during the finalization step 58, the self-service checkout terminal 10 allows the user to pay for his or her purchases. More specifically, in response to the payment signal, the self-service checkout terminal 10 either (1) generates a message on the display monitor 18 which instructs the user to insert currency into the currency acceptor 36, (2) charges a cash amount to a credit card with the card reader 34, or (3) reduces an amount stored on a debit, ATM, or smart card with the card reader 34. If the user inserts currency into the currency acceptor 36, the self-service checkout terminal 10 may provide change, if needed, via a paper currency dispenser (not shown) and/or a coin dispenser (not shown).

In addition, a receipt is also generated in the finalization step 58. In particular, the processing unit 12 communicates with a printer (not shown) associated with the ATM 23 in order to print the contents of the transaction table in a format suitable for use as a grocery receipt. After the receipt is printed, the finalization step 58 ends thereby causing the routine 50 to return to step 52 in which the self-service checkout terminal 10 is placed in the idle state until initialized by a subsequent user.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, it should be appreciated that the self-service checkout terminal 10 may be configured to include additional components in order to further verify that additional items are not inadvertently left in the shopping cart 32. In particular, the self-service checkout terminal 10 may be configured to include one or more infrared or proximity sensors positioned to detect the presence of an item on the lower rack 32*b* of the shopping cart 32.

In addition, it should be appreciated that although the verification activities herein described are performed by the user via use of a data input device (i.e. the touch screen of the display monitor 18 and/or the manual entry device 20), and have significant advantages thereby in the present invention. However, other types of verification activities may also be used in order to indicate the presence and/or absence of additional items. For example, the user may be instructed to perform a particular motion or other type of activity for detection by the video system 16 in order to verify the presence and/or absence of additional items.

What is claimed is:

1. A method of operating a self-service checkout terminal, comprising the steps of:

generating an end-of-itemization control signal in response to a user's indication that the user has no further items to enter into the checkout terminal;

generating a message in response to generation of the end-of-itemization control signal which instructs the user to (1) verify that the user has no further items to enter into the checkout terminal, and (2) perform a first verification activity if the user has no further items to enter into the checkout terminal; and generating a confirmation control signal in response to the user's performance of the first verification activity.

2. The method of claim 1, further comprising the step of:

generating a payment signal in response to generation of the confirmation control signal.

3. The method of claim 2, further comprising the step of:

reducing a cash amount stored on a cash card in response to generation of the payment signal.

4. The method of claim 2, further comprising the step of:

charging a cash amount to a credit card in response to generation of the payment signal.

5. The method of claim 2, further comprising the step of:

generating a message which instructs the user to tender currency into a currency acceptor in response to generation of the payment signal.

6. The method of claim 1, wherein the message generating step includes the step of generating a message which instructs the user to perform a second verification activity if the user has an additional item to enter into the checkout terminal, further comprising the step of:

generating a return-to-itemization control signal in response to the user's performance of the second verification activity.

7. The method of claim 6, further comprising the step of:

allowing the user to enter the additional item into the checkout terminal in response to generation of the return-to-itemization control signal.

8. The method of claim 1, wherein the message generating step includes the step of generating a message which instructs the user to (1) inspect a shopping cart of the user to verify that the shopping cart has no further items therein, and (2) perform the first verification activity if the shopping cart has no further items therein.

9. The method of claim 1, wherein:

the checkout terminal includes a display monitor having a touch screen, and the first verification activity includes the act of touching a first portion of the touch screen.

10. The method of claim 1, wherein:

the checkout terminal includes a manual entry device, and the first verification activity includes the act of depressing a first key of the manual entry device.

11. A method of operating a self-service checkout terminal, comprising the steps of:

generating an end-of-itemization control signal in response to a user's indication that the user has no further items to enter into the checkout terminal;

generating a message in response to generation of the end-of-itemization control signal which instructs the user to (1) inspect a shopping cart of the user to verify that the shopping cart has no further items therein, and (2) perform a first verification activity if the shopping cart has no further items therein; and generating a confirmation control signal in response to the user's performance of the first verification activity.

12. The method of claim 11, further comprising the step of:

generating a payment signal in response to generation of the confirmation control signal.

13. The method of claim 12, further comprising the step of:

reducing a cash amount stored on a cash card in response to generation of the payment signal.

14. The method of claim 12, further comprising the step of:

charging a cash amount to a credit card in response to generation of the payment signal.

15. The method of claim 12, further comprising the step of:

generating a message which instructs the user to tender currency into a currency acceptor in response to generation of the payment signal.

16. The method of claim 11, wherein the message generating step includes the step of generating a message which instructs the user to perform a second verification activity if the shopping cart has an additional item therein, further comprising the step of:

generating a return-to-itemization control signal in response to the user's performance of the second verification activity.

17. The method of claim 16, further comprising the step of:

allowing the user to enter the additional item into the checkout terminal in response to generation of the return-to-itemization control signal.

18. A self-service checkout terminal comprising:

means for generating an end-of-itemization control signal in response to a user's indication that the user has no further items to enter into the checkout terminal;

means for generating a message in response to generation of the end-of-itemization control signal which instructs the user to (1) verify that the user has no further items to enter into the checkout terminal, and (2) perform a first verification activity if the user has no further items to enter into the checkout terminal; and means for generating a confirmation control signal in response to the user's performance of the first verification activity.

19. The self-service checkout terminal of claim 18, further comprising:

means for generating a payment signal in response to generation of the confirmation control signal.

20. The checkout terminal of claim 18, further comprising:

means for generating a message in response to generation of the end-of-itemization control signal which instructs the user to perform a second verification activity if the user has an additional item to enter into the checkout terminal; and means for generating a return-to-itemization control signal in response to the user's performance of the second verification activity.

* * * * *